United States Patent [19]
Ninomiya et al.

[11] Patent Number: 5,926,826
[45] Date of Patent: Jul. 20, 1999

[54] FLASH MEMORY ERASABLE PROGRAMMABLE ROM THAT HAS UNIFORM ERASING AND A REPLACEABLE WRITING START MARK, FLAG, OR POINTER FOR USE IN BLANK, FREE, OR EMPTY BLOCKS

[75] Inventors: Yoshihiko Ninomiya, Daito; Toshihiro Waguri, Kobe, both of Japan

[73] Assignee: Sanyo Electric Co., Ltd., Osaka, Japan

[21] Appl. No.: 08/825,394

[22] Filed: Mar. 28, 1997

[30] Foreign Application Priority Data

Mar. 29, 1996 [JP] Japan .................................. 8-076437

[51] Int. Cl.⁶ .................................................. G06F 12/00
[52] U.S. Cl. ................................................... 711/103
[58] Field of Search ...................... 711/103; 365/185.33; 395/622, 430, 601, 182.06, 185.33, 641

[56] References Cited

U.S. PATENT DOCUMENTS

| | | | |
|---|---|---|---|
| 5,544,356 | 8/1996 | Robinson | 395/600 |
| 5,559,956 | 9/1996 | Sukegawa | 395/182.06 |
| 5,592,662 | 1/1997 | Sanada | 395/601 |
| 5,611,067 | 3/1997 | Okamoto | 395/430 |
| 5,627,783 | 5/1997 | Miyauchi | 365/185.33 |
| 5,719,808 | 2/1998 | Harari | 365/185.33 |

*Primary Examiner*—Eddie P. Chan
*Assistant Examiner*—Kimberly Nicole McLean
*Attorney, Agent, or Firm*—Armstrong, Westerman, Hattori, McLeland, and Naughton

[57] ABSTRACT

An erasable programmable ROM has a storage area which is divided into blocks having a predetermined block length, each assigned a block address and provided with information. With reference to block addresses and information, the CPU specifies the blocks to be used for storing and writes a file to the ROM in block units. The CPU writes the file first to a blank block having a writing start mark written the blank block when the blank block is present or to an optional blank block if otherwise and then successively to other blank blocks. On completion of writing, the CPU searches for a blank block downstream from the last block used for writing and writes a writing start mark to the blank block found.

4 Claims, 7 Drawing Sheets

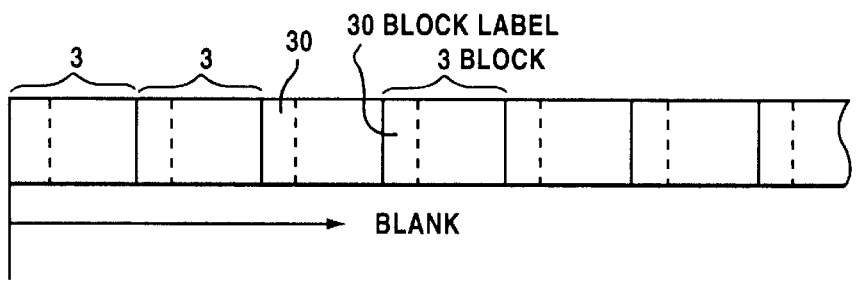
FIG.1a
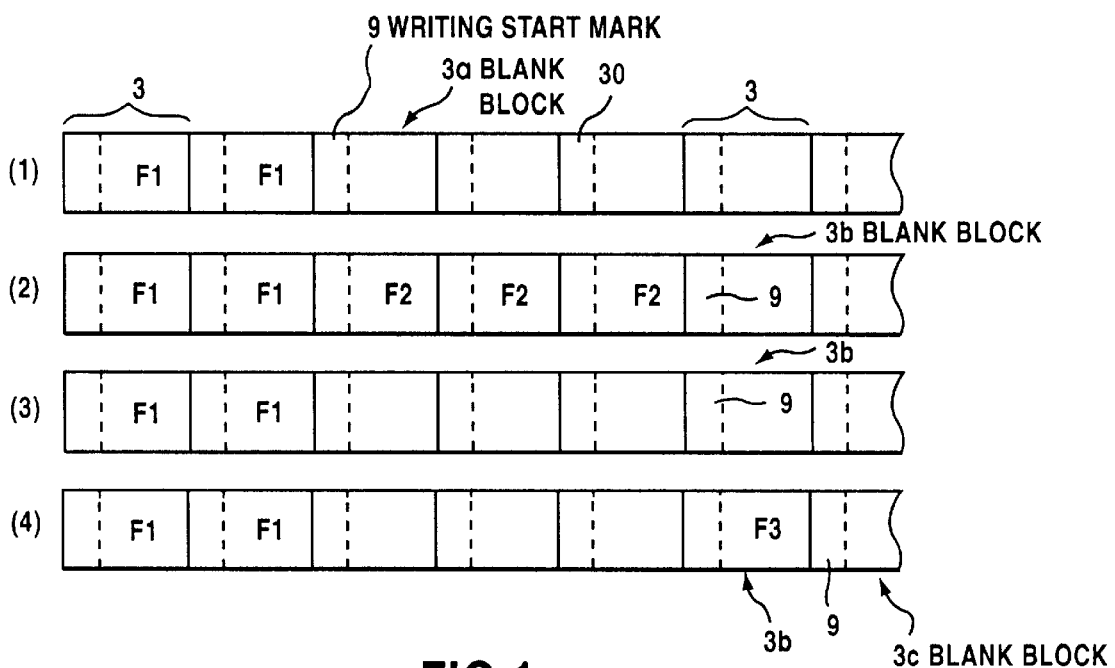
FIG.1b
FIG.1c
PRIOR ART
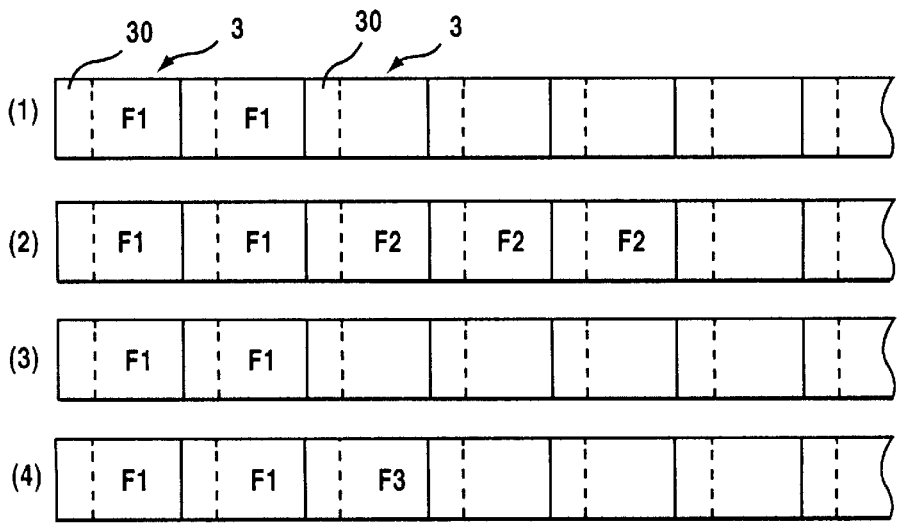

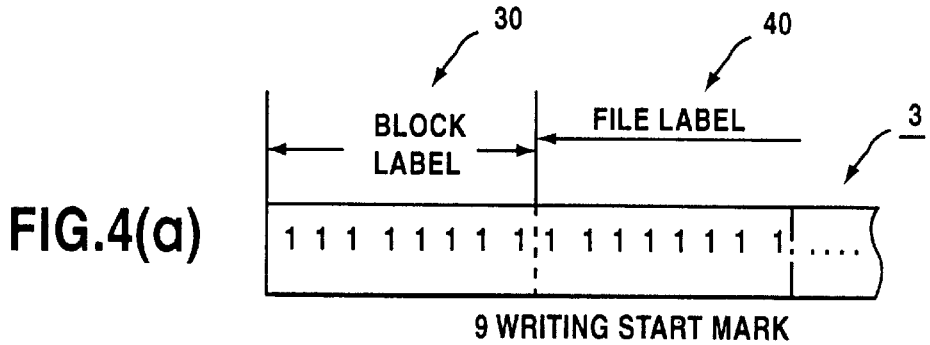
FIG.4(a)
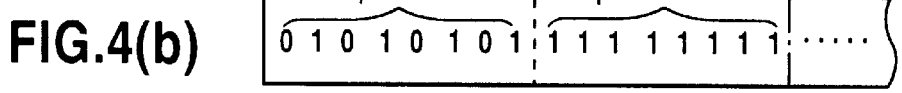
FIG.4(b)
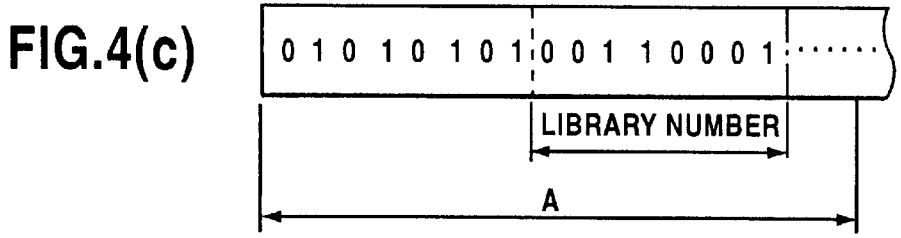
FIG.4(c)
FIG.5
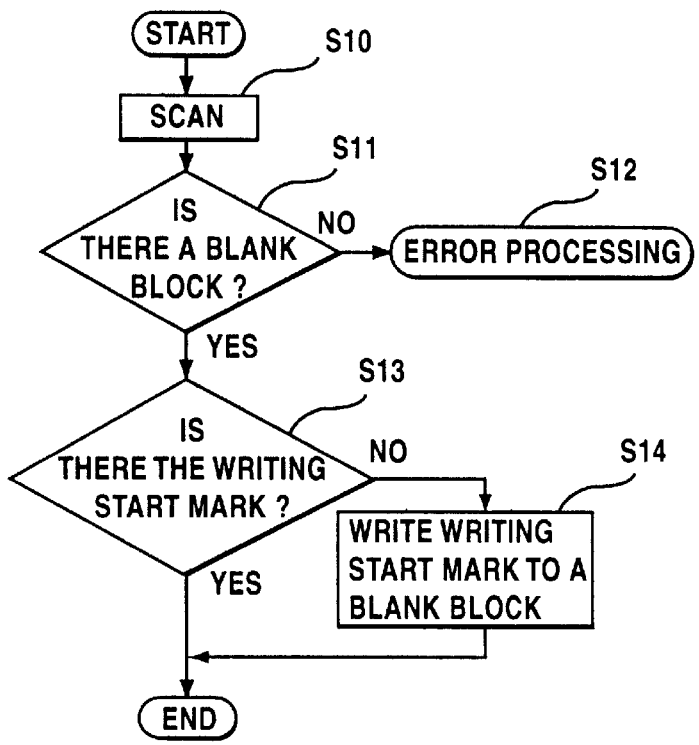

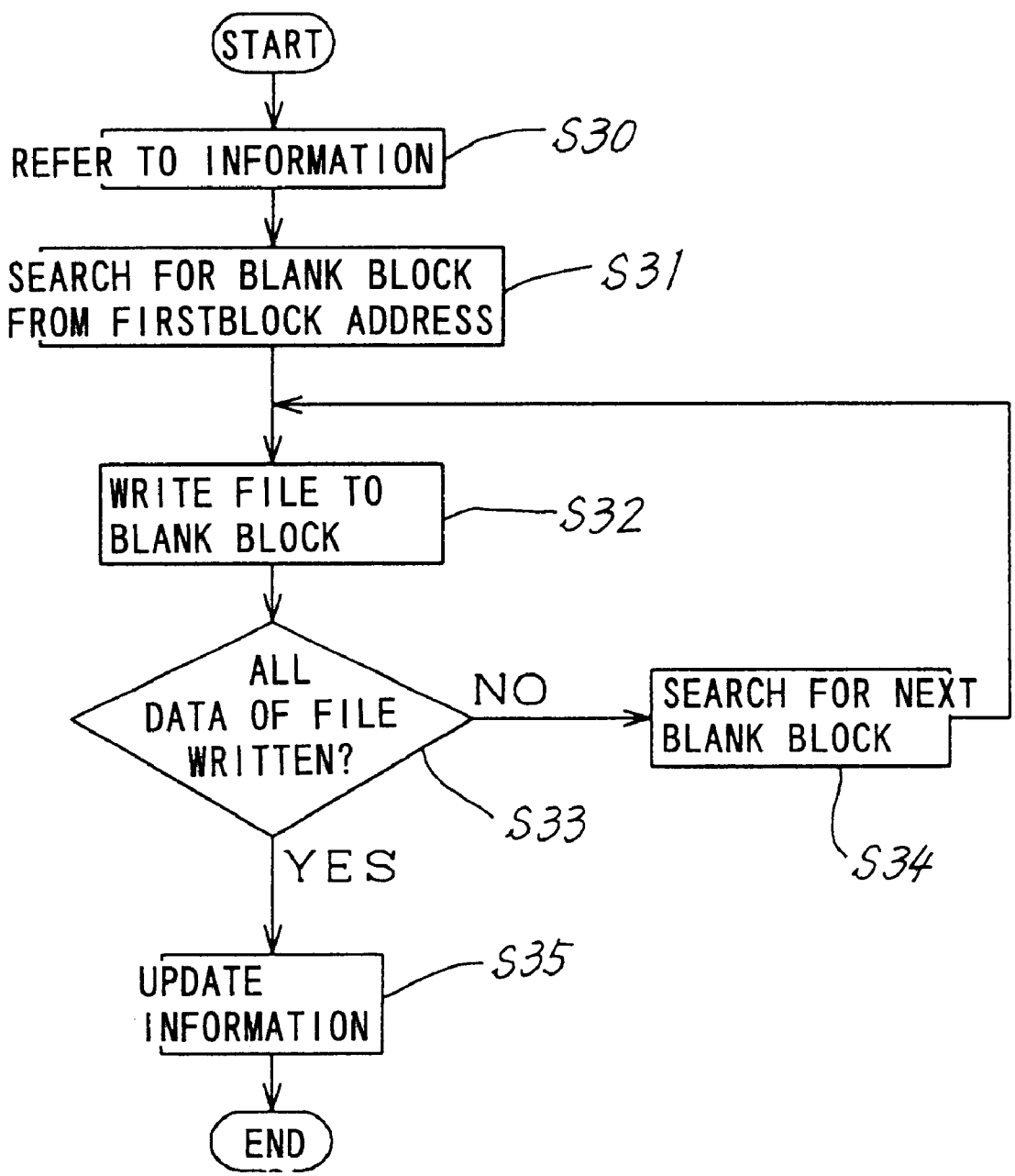

FLASH MEMORY ERASABLE PROGRAMMABLE ROM THAT HAS UNIFORM ERASING AND A REPLACEABLE WRITING START MARK, FLAG, OR POINTER FOR USE IN BLANK, FREE, OR EMPTY BLOCKS

FIELD OF THE INVENTION

The present invention relates to a method of and a device for storing digital data in erasable programmable ROMs such as flash memories.

BACKGROUND OF THE INVENTION

Electronic devices, such as computers, for processing digitalized data usually have an external storage device for storing digital data and holding the data even when cut off from the power supply. The external storage device used is, for example, a magnetic disk or erasable programmable ROM.

With reference to FIG. 2, digital data is written to, or read or erased from an external storage device such as an erasable programmable ROM 1 under the control of a CPU 2. Since the CPU 2 writes or reads data to or from the ROM 1 in predetermined data lengths, the storage area of the ROM 1 is divided into regions of predetermined data length. The small regions thus divided will be referred to as "blocks 3," and the length of the blocks 3 as the "block length." To specify particular blocks on which the read or write operation is to be performed, an address is assigned to each of the blocks 3.

Further digital data is processed in the form of a unit of items grouped. The unit of items of digital data will be referred to as a "file 4," and the length of the file as the "file length." The file length is variable; some files are shorter than the block length, and some files are greater than the block length.

Accordingly, for the CPU 2 to write or read a file to or from the erasable programmable ROM 1, it is necessary to store, for every block and in a specified location of the ROM 1, information such as information indicating whether the block 3 has data stored therein, and information indicating the connection or relation between a plurality of blocks when the file is stored in the blocks. The information to be stored in the specified position of each block 3 will be termed a "block label 30."

With reference to FIG. 8 showing the procedure to be performed by the CPU 2 for writing a file 4 to the erasable programmable ROM 1, the CPU 2 searches the memory for a blank block (with no stored data) usually in the order of increasing block address values (S31) with reference to information such as block labels 30 stored in specified locations in the ROM 1 (S30), writing digital data of the file 4 and a block label 30 to the blank block found (S32) and repeating these steps until the entire digital data of the file 4 is written (S33, S34), whereby the information is updated (S35).

For example, suppose the erasable programmable ROM 1 is divided into blocks 3, and a block label 30 of predetermined length is stored as information at the head of each block 3 as shown in FIG. 1a. When a file F1 having such a length that it can be stored in two blocks and a file F2 having such a length as to be accommodated in three blocks are to be written to the ROM 1 in its initial state containing no digital data (FIG. 1a), the file F1 is written to the first two blocks [(1)], and the file F2 is written to the three blocks immediately following the first two blocks [(2)] as shown in FIG. 1c. When a file F3 having such a length as to be stored in one block is to be written to the ROM 1 after the stored file F2 is deleted [(3)], the file F3 is written usually to the block immediately following the file F1 like the file F2. Consequently it is likely that data will be rewritten concentrically to blocks of small address values.

The external storage device is impaired in reliability when becoming unerasable even if locally. Especially the erasable programmable ROM 1 is limited in erasability, i.e., frequency of erasure, and the flash memory 10 is erasable up to about 10,000 times. If the flash memory 10 is erased approximately uniformly over its storage area, the memory which has been erased such a large number of times is still usable for a considerable period of time, whereas data is rewritten concentrically to a local area by the conventional storage method, with the result that unerasable region occurs to entail impaired reliability.

An object of the present invention is to provide a method of and device for writing digital data to the entire area of an erasable programmable ROM on the average without concentration on a local area of the ROM by utilizing the regions for storing the aforementioned information.

SUMMARY OF THE INVENTION

To fulfill the above object, the CPU of the invention performs a writing operation on an erasable programmable ROM in the following manner.

On starting, resetting or replacement of the erasable programmable ROM, the entire storage area of the ROM is scanned to read block labels. Simultaneously with this, the ROM is searched for a blank block having already written thereto a writing start mark, which is distinguishable from the block label and replaceable by a block label by overwriting, at a predetermined position in the region where the block label is to be written. In the absence of the blank block having the writing start mark, a writing start mark is written to the predetermined position in an optional blank block.

Next, a block label and a file are written first to the blank block having the writing start mark and then successively to blank blocks following and downstream from the blank block with the mark. If there is no blank block in the downstream direction, the operation to write the block label and the file is resumed at the head block of the ROM and the blank blocks downstream therefrom. After the completion of the block label and file writing operation, a blank block is searched for in the downstream direction. If no downstream blank block is found, the blank block search is resumed at the head block of the ROM and toward the downstream direction again. A writing start mark is written to the blank block found, at the predetermined position in the region where a block label is to be written.

For example, suppose the storage area of the erasable programmable ROM 1 is divided into blocks 3, and a block label 30 is to be stored at the head of each block 30 by the above storage method as shown in FIG. 1a. For example, a case will be discussed wherein the ROM 1 in its initial state having no digital data stored therein (FIG. 1a) is to store a file F1 having such a length that it can be stored in two blocks and a file F2 having such a length that it can be stored in three blocks, followed by deletion of the file F2 and writing of a file F3 having such a length that it can be stored in one block. As shown in FIG. 1b, the file F1 is written to the first two blocks, whereupon a writing start mark 9 is written to a predetermined position in the region of the next blank block 3a where a block label 30 is to be written [(1)]. Next, the file F2 is written to three blank blocks starting with the blank block 3a having the writing start mark 9. At this time, the writing start mark 9 is changed to a block label 30 by overwriting. After the file F2 has been written, a writing start mark 9 is written to the nearest next blank block 3b [(2)]. Subsequently the file F2 is deleted, but the position of the writing start mark 9 remains unchanged [(3)]. The file F3 is written to the blank block 3b storing the writing start mark 9 and immediately following the deleted file F2. The writing start mark 9 is changed to a block label 30 by overwriting also at this time. After the file F3 has been written, a writing start mark 9 is written to the next blank block 3c [(4)].

After the file in the blocks upstream from the blank block bearing the writing start mark is deleted, writing of another file is not started at the deleted block, so that the operation described above eliminates concentration of rewriting to a local area. Because digital data can be written generally uniformly over the storage area, it is possible to prevent early impairment of reliability of the erasable programmable ROM as an external storage device.

BRIEF DESCRIPTION OF THE DRAWINGS

FIG. 1a is a memory map of an erasable programmable ROM having no digital data stored therein;

FIG. 1b includes memory maps showing the writing operation of the invention on the ROM;

FIG. 1c includes memory maps showing the conventional writing operation on the ROM;

FIG. 4 shows digital data to be written to the head region of a block in the flash memory, (a) showing the block when empty, (b) showing the block with a writing start mark written thereto and (c) showing the block with a file label written thereto;

FIG. 5 is a flow chart showing the operation of a CPU to be performed on the flash memory when the recording-playback system is started or reset or upon replacement of the flash memory;

FIG. 8 is a flow chart showing a conventional writing operation.

DETAILED DESCRIPTION OF THE INVENTION

An embodiment of the invention will be described below in greater detail with reference to the drawings.

Figure 2:
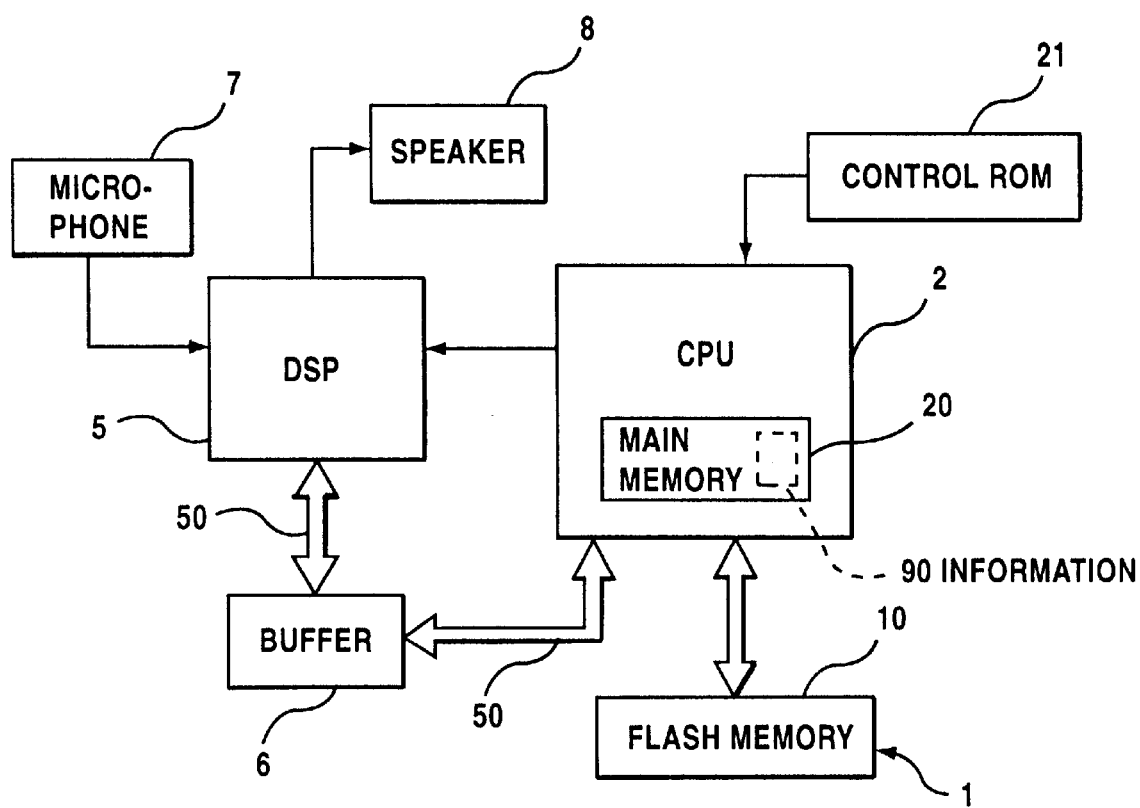
FIG. 2 is a block diagram showing a solid recording-playback system using a flash memory according to the invention.

FIG. 2 shows a solid recording playback system embodying the invention. The term "solid recording-playback system" refers to a recording-playback system wherein a semiconductor memory is used as a recording medium in place of a magnetic tape.

The solid recording-playback system has a microphone 7 for converting voice or sound into an analog signal, a speaker 8 for converting an analog signal into sound and a DSP (digital signal processor) 5 connected to the microphone 7 and the speaker 8 for digital signal processing. Under the command of the CPU 2 to be described below, the DSP 5 converts the analog signal from the microphone 7 to a digital signal and compresses the signal, or expands a compressed digital signal and converts the signal to an analog signal.

The recording-playback system further has a semiconductor memory serving as an external storage device for writing or reading compressed digital signals. According to the present embodiment, the semiconductor memory used is a flash memory 10 or like erasable programmable ROM 1. The system further includes a CPU 2 for controlling the operation of reading data from or writing data to the ROM 1 and commanding the above operation of the DSP 5. Connected to the CPU 2 is a control ROM 21 having programs for executing the control and commanding operations. The CPU 2 has a main memory 20 for storing the compressed digital signals, programs and information 90 from the erasable ROM 1.

The compressed digital signal is transferred through a bus 50 interconnecting the CPU 2 and the DSP 5. A buffer 6 is provided at an intermediate portion of the bus 50 for adjusting the difference in processing speed that would be produced between the CPU 2 and the DSP 5 owing to other process executed by the CPU 2.

The operation of the recording-playback system will be described next. When the power source of the system is turned on, the CPU 2 retrieves a desired program from the control ROM 21.

For recording, sound is input to the microphone 7, and converted to an analog voltage signal, which is transferred to the DSP 5. Under the command of CPU 2, the DSP 5 converts the analog signal to a digital signal (A/D conversion) and compresses the signal. The compressed digital signal is temporarily stored in the buffer 6, then stored in the main memory 20 within the CPU 2 and further stored in the erasable programmable ROM 1. The procedure described is thereafter repeated.

For playback, the CPU 2 reads the desired compressed digital signal from the ROM 1 via the main memory 20 and temporarily stores the signal in the buffer 6. In response to a command from the CPU 2, the DSP 5 expands the compressed digital signal transferred from the buffer 6 and then converts the signal to an analog signal, which is further transferred to the speaker 8. The speaker 8 converts the analog signal to sound and outputs the sound.

According to the present embodiment, the flash memory 10 or like erasable programmable ROM 1 is such a semiconductor memory that the digital data stored therein does not disappear even if the power source is turned off but can be erased, for example, electrically for storing new data. Unlike the magnetic disk device, the erasable programmable ROM has no drive mechanism, is adapted to store or deliver data electrically and is therefore advantageous for use as a compacted lightweight external storage device. For this reason, such ROMs are widely used recently as memory devices such as IC cards or PC cards.

However, the erasable programmable ROM 1 is limited in the number of times it is erasable, which is about 10,000 in the case of the flash memory 10 as stated previously, so that if the data is rewritten concentrically at a portion of the storage area, an unerasable region will occur early to impair the reliability of the external storage device.

Accordingly, the storage method of the present invention is utilized. A detailed description will be given of the construction of the flash memory 10, the structure of the file to be written to the flash memory 10 and the writing operation of the CPU 2 on the flash memory 10 according to the present embodiment.

The storage area of the flash memory 10 is divided into blocks having a definite block length (1024 bytes according to the present embodiment), and a block address is assigned to each block 3.

A length of compressed digital signal to be transferred to the CPU 2 during a recording period will be referred to as a "library." The library has a very large data length which is variable. For example, recording data for 20 minutes is up to about 2 MB (megabytes) when converted to a compressed digital signal. Accordingly, when to be stored in the flash memory 10, the library is divided every sampling rate for the A/D conversion by the DSP 5 into files 4 for groups of consecutive blank blocks in the flash memory 10. Thus, the file 4 is written sequentially to consecutive storage regions, so that there is no need for information indicating the connection or relation between the blocks to which the particular file 4 is written.

Figure 3:
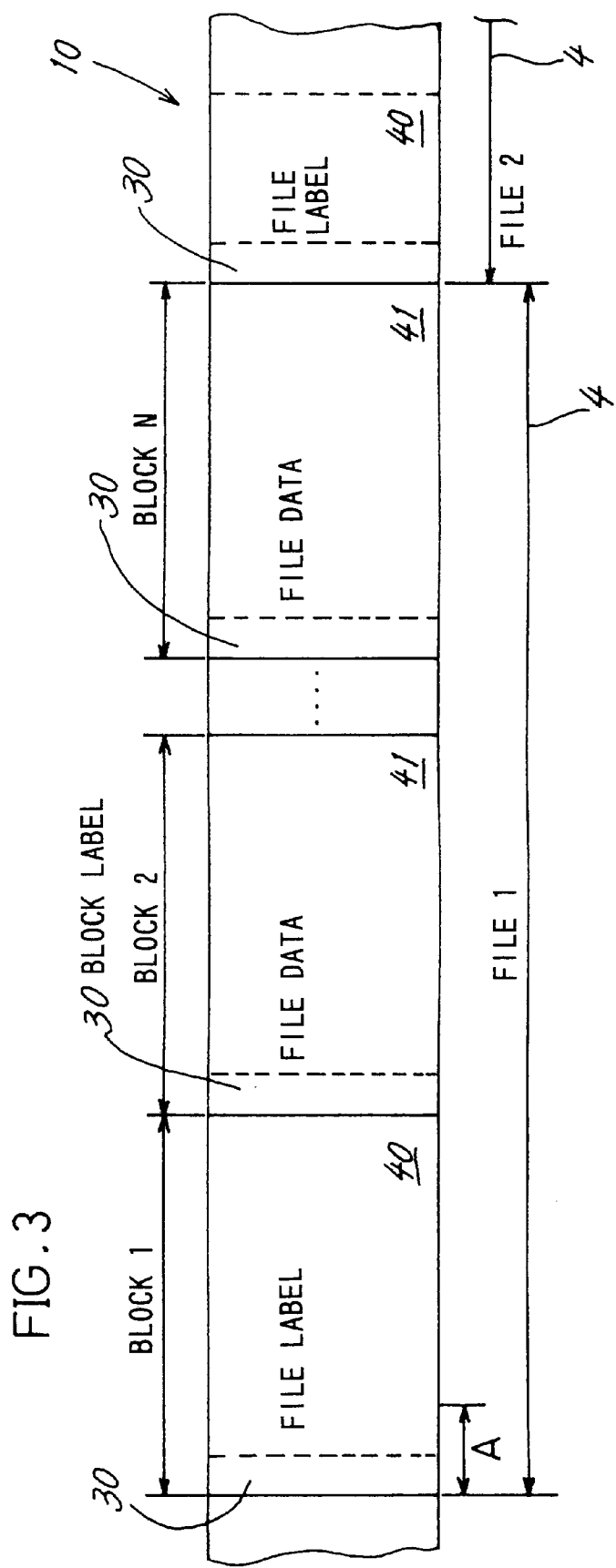
FIG. 3 is a memory map showing the structure of a file to be written to the flash memory in practicing the invention.

The present embodiment requires information as to the relation between the files of a particular library and information, such as sampling rate, as to the library and files. As shown in FIG. 3, therefore, information as to each block is stored as a block label 30 at the head of the block 3, and information as to the library and each file is disposed as a file label 40 at the head of the file 4. Thus, the file 4 comprises the file label 40 indicating the information and file data 41 which is actual data, i.e. compressed digital signal.

As shown in FIG. 3, the block label 30 is written in a predetermined byte at the head of each block 3, and the file 4 is written to the rear of the block label 30. The file label 40 and file data 41 are written to separate blocks so as to be distinguishable from each other.

The block label 30 shows information as to the block, e.g., as to whether the block is a blank block, a block having the file label 40 written thereto, a block having the file data 41 written thereto, or an unerasable block. The file label 40 shows information as to the file such as a library number specifying the library, a file number indicating the order of the file in the library and the capacity of the file data 41.

At a predetermined position in the region of a blank block to which a block label 30 and file label 40 are to be written, a writing start mark 9 is written which mark can be distinguished from the block label 30 or file label 40 and replaceable by a block label 30 or file label 40 by overwriting.

For example, in the flash memory 10 or EEP-ROM, each bit of the blank block in which data was erased or is no writing is 1 (H level). Suppose a block label 30 is stored in the form of a byte (8 bits) at the head of a block 3 as shown in FIG. 4. Further suppose when the block is blank, the data $11111111_{(2)}$ is stored, and when a file label 40 or writing start mark 9 is written to the block, the data $01010101_{(2)}$ is stored. It is also assumed that a library number is stored as a byte at the head of the file label 40.

At this time the library number is 1-byte data limited to the range of 0 to $254_{(10)}$. When the data $01010101_{(2)}$ as a block label and the data $11111111_{(2)}$ ($=255_{(10)}$) as a library number are stored as shown in FIG. 4(b) in the blank block shown in FIG. 4(a), the latter data exceeds the limit of the library numbers, so that the data stored in the position of the library mark can be identified as the writing start number 9. The data $11111111_{(2)}$ meaning the writing start mark 9 can be changed to an actual file label 40 such as the library number data $00110001_{(2)}$ ($=49_{(10)}$) as shown in FIG. 4(c).

The operation of the CPU 2 to write digital data to the flash memory 10 will be described with reference to the flow charts of FIGS. 5 to 7.

When the solid recording-playback system is started or reset for restarting, or the flash memory 10 is replaced, the CPU 2 scans the flash memory 10 to read block labels 30 and file labels 40 on the main memory 20 as shown in FIG. 5 (S10). When no blank block is found with reference to the block labels 30 and file labels 40 on the main memory 20 (S11), error processing for no capacity is executed (S12). If otherwise and further in the absence of a blank block having the writing start mark 9 (S13), a writing start mark 9 is stored in a blank block (S14).

Figure 6:
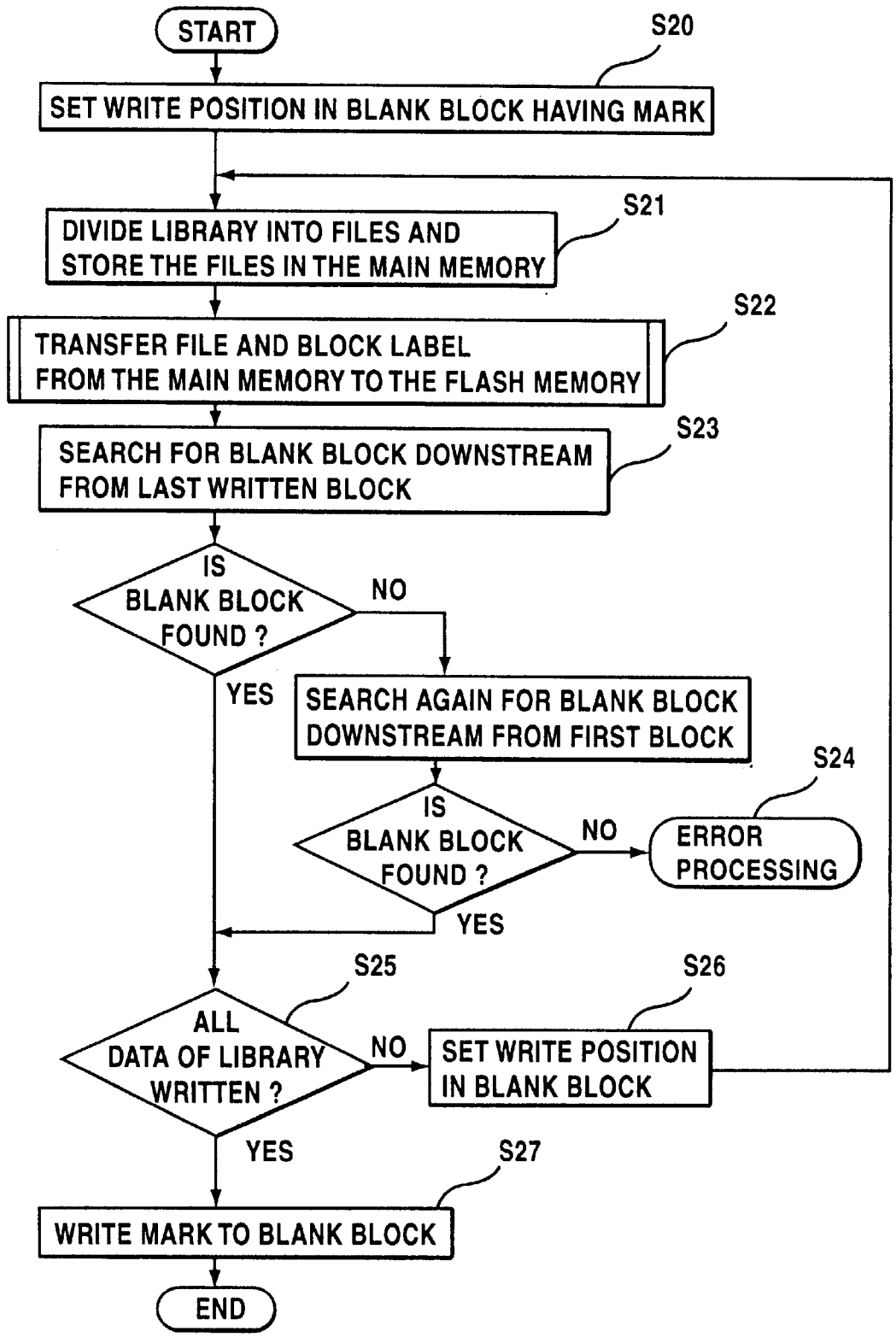
FIG. 6 is a flow chart showing the writing operation to be performed by the CPU on the flash memory for recording.
Figure 7:
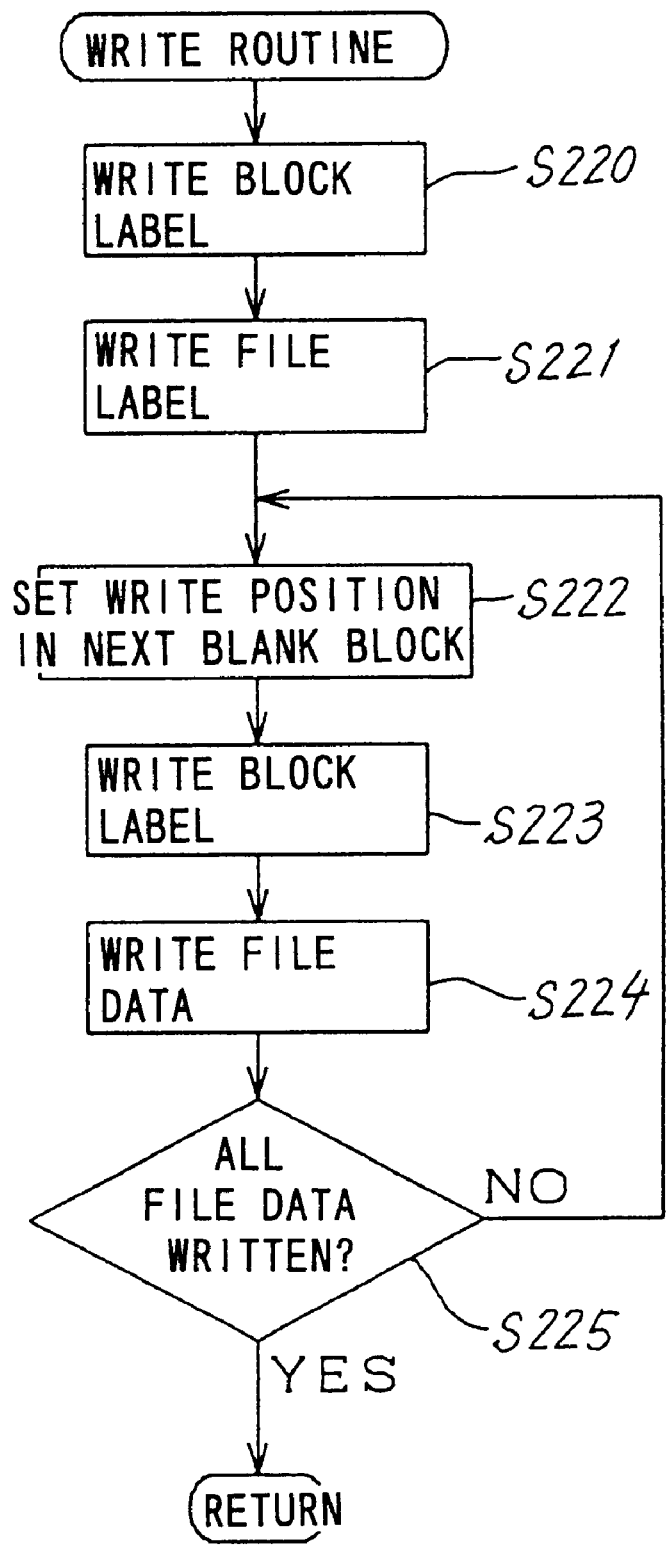
FIG. 7 is a flow chart showing a writing subroutine.

For recording, a write position is set at the address of the block 3 having the writing start mark 9 as shown in FIG. 6 (S20). Next, a library transferred from the DSP 5 is divided every sampling rate of A/D conversion by the DSP 5 for groups of consecutive blank blocks in the flash memory 10 and stored as files 4 in the main memory 20 (S21). At this time, required data, such as a library number, file number and capacity of file data 41, is stored as a file label 40 in the file 4. Next, the file 4 and block label 30 are transferred from the main memory 20 to the flash memory 10 (S22). After the file 4 has been completely written, a blank block is searched for downstream from the last written block (S23). If no blank block is found even when the memory is searched to the last block thereof, the memory is searched again from its first block in the downstream direction. If no blank block is found to the last written block, error processing "no blank block" is executed (S24). When a blank block is found, an inquiry is made as to whether the entire signal of the library has been written (S25). If the inquiry is answered in the negative, a write position is set in the blank block found (S26), whereupon the sequence returns to the division of files 4 (S21). If the writing has been completed, a writing start mark 9 is written to the blank block found (S27), whereby the writing operation is completed.

The step (S22) of writing the file 4 and block label 30 from the main memory 20 to the flash memory 10 will be described in greater detail. With reference to FIG. 7, a block label 30 indicating that a file label 40 has been written is written to the head of the block having the writing start mark 9 (S220), and the file label 40 is then written (S221). At this time, the writing start mark 9 is changed to a block label 30 or file label 40 by overwriting. Next, a write position is set in the next block (S222), a block label 30 indicating that file data 41 has been written is written to this block (S223), and the file data 41 is then written (S224). If there is file data 41 still remaining to be written, the sequence returns to the step of setting a write position in the next block (S222). If otherwise, the sequence returns to the original routine (S225).

When the information of block label 30, file label 40 and writing start mark 9 is written to the flash memory 10, the information stored in the main memory 20 is also updated at all times.

Consequently, even when the file in the blocks upstream from the block bearing the writing start mark 9 is erased, no file is written first from the erased blocks, but a file is always written first to a blank block having a writing start mark 9 and downstream from the last written block. This precludes concentration of rewriting on a local area, consequently ensuring substantially uniform writing over the storage area and preventing early impairment of the reliability of the flash memory 10.

Since the writing start mark 9 can be changed to a block label 30 and file label 40 by overwriting, there is no need to prepare additional regions in the flash memory 10 for storing the writing start mark 9 only, nor is it necessary to perform a time-consuming operation to erase the writing start mark 9 from the flash memory 10.

The foregoing embodiment is given for illustrating the present invention and should not be construed as limiting the invention defined in the appended claims or reducing the scope thereof. The device of the invention is not limited to the embodiment in construction but can of course be modified variously within the technical scope of the invention as set forth in the claims.

For example, the flash memory 10 or like erasable programmable ROM 1 is used according to the embodiment, whereas since the repeatedly erased storage area is liable to become unerasable in the case of magnetic disk devices, the present invention is applicable also to such other external storage devices. The invention is especially useful for opto-magnetic disk devices wherein the storage area requires erasure for changing the existing data to new data by overwriting as in the flash memory 10.

It is possible to store in the file label 40 information relating to the relation between files, such as the block address at the head of one of the file having a file number immediately preceding or following that of the other file, bit rate or like information relating to. the DSP 5, etc., in addition to the library number, file number and data capacity.

Further according to the invention, when none of blank blocks in the flash memory 10 have the writing start mark 9, the mark 9 is written to one of the blank blocks (S14) so that the writing start mark 9 is present at all times before the file 4 is written to the flash memory 10 as shown in FIG. 5, whereas this step can be omitted, such that the writing operation of FIG. 6 is started at an optional blank block if none of the blank blocks have the mark 9. The writing start mark 9 is written after the completion of writing even in this case, whereby the advantage of the invention can be obtained similarly.

Although the file label 40 is stored at the head of the file 4 like a header of file in the case of the embodiment, the label 40 can be stored alternatively at the rear end of the file like a footer of file.

The file label 40 and the file data 41 are written to separate blocks in the embodiment to make distinction between the file label 40 and the file data 41, whereas the file label 40 can be immediately followed by the file data 41 to efficiently use the storage area.

What is claimed is:

1. A method of storing the file in a flash memory erasable programmable ROM of a memory device, the memory device comprising:

said ROM having a storage area divided into blocks of a predetermined block length, a block address being assigned to each of the blocks, a block label of a predetermined length being storable at the head of each block; and a CPU comprising a main memory, said CPU forming a file comprising file data and a file label disposed at the head or rear end of the file data, storing the file in the main memory, specifying block addresses with reference to the block labels, and writing the file in the units of blocks to blank blocks of the ROM, the method including the steps of:

(1) identifying the blank block having a writing start mark in starting or resetting of the memory device, or replacement of the ROM, the writing start mark being distinguishable from the block label or file label and replaceable by a block label or file label by overwriting, the identifying step including the steps of, (a) reading the block labels, or the block labels and the file labels by scanning the entire storage area of the ROM, and (b) finding the writing start mark at a predetermined position in the block label or file label by checking the block labels or file labels, the finding step including the step of writing the writing start mark to one of the blank blocks at the predetermined position thereof when no blank block having the writing start mark is found by the checking step;

(2) writing block labels and the file successively to blank blocks following and downstream from the blank block with the writing start mark, said step of writing block labels and the file including the steps of returning to the block at the head of the ROM if no downstream blank block is found by the writing step and writing the rest of block labels and the file successively to blank blocks downstream from the head block;

(3) searching for a downstream blank block after completion of the step of writing block labels and the file, said searching step including the steps of returning to the block at the head of the ROM if no downstream blank block is found by the searching step and searching again for a downstream blank block; and (4) writing the writing start mark to the blank block found by the searching step, at the predetermined position thereof.

2. A method as defined in claim 1 wherein instead of the step of writing the writing start mark in said identifying step, said step of writing block labels and the file writes the block labels and the file first to the blank block having the writing start mark or to one of the blank blocks when no blank block having the writing start mark is present, and then successively to blank blocks downstream from the blank block.

3. A memory device comprising:

a flash memory erasable programmable ROM having a storage area divided into blocks of a predetermined block length, a block address being assigned to each of the blocks, a block label of a predetermined length being storable at the head of each block; and a CPU accessible to the ROM, the CPU comprising, a main memory, file formation means for forming a file comprising file data and a file label disposed at the head or rear end of the file data, file storage means for storing the file in the main memory, and file writing means for writing the file to the ROM, said file writing means specifying block addresses with reference to the block labels and writing the file in the units of blocks to blank blocks of the ROM, the CPU further comprising block identification means for identifying the blank block having a writing start mark in starting or resetting of the memory device, or replacement of the ROM, the writing start mark being distinguishable from the block label or file label and replaceable by a block label or file label by overwriting, said block identification means is comprising, reading means for reading the block labels, or the block labels and the file labels by scanning the entire storage area of the ROM, and mark finding means for finding the writing start mark at a predetermined position in the block label or file label by checking the block labels or file labels, the mark finding means including mark write first means for writing the writing start mark to one of the blank blocks at the predetermined position thereof when no blank block having the writing start mark is found, said file write means further writing block labels and the file successively to blank blocks following and downstream from the blank block having the writing start mark, or returning to the block at the head of the ROM when no downstream blank block is found and writing the rest of block labels and the file successively to blank blocks downstream from the head block, said CPU fruther comprising, block search means for searching for a downstream blank block, or returning to the block at the head of the ROM when no downstream blank block is found and searching again for a downstream blank block, after writing by the file write means; and mark write second means for writing the writing start mark to the blank block found by said block search means, at the predetermined position thereof.

4. A memory device as defined in claim 3 wherein in place of the mark write first means, the file writing means writes block labels and the file first to the blank block having the writing start mark or to one of the blank blocks when no blank block having the writing start mark is present, and then successively to blank blocks downstream from the blank block.

* * * * *